UNITED STATES PATENT OFFICE 3,522,620
Patented Aug. 4, 1970

3,522,620
WINDSHIELD WIPER BLADE
Akira Nozawa, Tetsuichi Saho, Hideo Marumo, and Minoru Saito, Tokyo, Japan, assignors to Lion Yushi Kabushiki Kaisha (Trade name: Lion Fat & Oil Co., Ltd.), Tokyo, Japan
No Drawing. Continuation-in-part of application Ser. No. 404,932, Oct. 19, 1964. This application June 7, 1968, Ser. No. 735,170
Claims priority, application Japan, Feb. 13, 1964, 39/32,394
Int. Cl. A47l 1/02; C08c 11/44; C08f 45/44
U.S. Cl. 15—250.36
15 Claims

ABSTRACT OF THE DISCLOSURE

An improved windshield wiper blade having a reduced frictional coefficient, which essentially consists of an elastic substance such as natural rubber or synthetic rubber and at least one of certain nitrogen-containing organic compounds.

---

This application is a continuation in part of Ser. No. 404,932, filed Oct. 19, 1964 and now abandoned.

The present invention relates to a windshield wiper blade. More specifically speaking, it relates to a wiper blade made by blending 1 to 100 parts of at least one material selected from among the compounds represented by the following Formula I with 100 parts of an elastic substance selected from among natural rubber, and synthetic rubbers, and if desired, compound the resulting mixture with various known additives, and forming it in a mold.

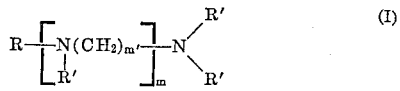

wherein R is an aliphatic hydrocarbon having 8 to 24 carbon atoms;
R' is selected from the group consisting of hydrogen, CHR"CHR"COOR''' and CHR"CHR"CN, at least one R' being CHR"CHR"COOR''' or CHR"CHR"CN, in which R" is selected from the group consisting of a hydrogen radical and an aliphatic hydrocarbon radical having 1 to 5 carbon atoms, and R''' is an aliphatic hydrocarbon radical having 1 to 24 carbon atoms;
m is an integer selected from 0, 1 and 2; and
m' is an integer selected from 2 and 3.

The wiper blade formed in accordance with this invention possesses a low frictional resistance and a high resistance to aging by virtue of blending said material selected from the compounds having the Formula I.

Wiper blades which wipe rain drops, snow-flakes or dust off the front windshield of an automobile, a streetcar, or the like, are usually made of an elastic material such as rubber. When it is made of an elastic material alone, the load imposed on the wiper motor will be large and the wiper will be subjected to considerable vibration, so that it will have a poor cleaning effect.

To eliminate this trouble, a sulphurizing or halogenating treatment of the blade surface has been suggested for the purpose of reducing its frictional resistance. But such surface treatment will cause an aging of the blade surface, with the result that the surface becomes liable to cracking and the blade life is shortened.

The wiper in service, being fitted on the outside of a vehicle, is exposed to the direct sun and other weather influences; accordingly it is vulnerable to aging. Since such surface treatment renders the blade less resistant to such influences, it is obvious that such treatment is undesirable. Moreover, surface treatment hardens the blade surface so that if there is any dust particle between blade and glass, the surface of glass will be scratched.

It has also been suggested that a wiper blade be chemically treated to increase the friction between the blade and windshield. Such chemical treatment, too, can produce only a temporary effect and it is unsatisfactory because it damages the rubber, resulting in its oxidation and aging.

Wiper blades formed in a mold from an elastic substance blended with various surface active substances have been kown. Such conventional wiper blades when much water is present between the windshield and the wiper blade, are relatively effective because the frictional co-efficient is low enough to cause no trouble in practice. However, the problems in practice with the conventional wiper blade happen when it has just started raining or it is raining so lightly that the frictional co-efficient of the glass and wiper blade would not be depressed enough.

The present invention provides a wiper blade which reduces sufficiently the frictional co-efficient even when the windshield is dry or slightly moistened.

The present invention is the fruit of research directed to the production of a less frictional, more effective wiper blade without resorting to any surface treatment. According to this invention, 1 to 100 parts, preferably 10 to 30 parts, of said material of the Formula I is blended and kneaded with 100 parts of an elastic substance. A plasticizer, an antiaging agent and an ozonecrack inhibitor may be added and the resulting mixture formed into the product. The resulting wiper blade is not only less frictional and more effective in cleaning, but is also more resistant to aging with longer service life. The wiper blade made of this new material is so flexible that it will not be scratched by any dust particle sticking between the blade and the glass.

The present invention has the great industrial advantage of calling for no production stage such as surface treatment, after forming, because in this invention said material of the Formula I which considerably improves the property of the conventional wiper blade can be blended and kneaded with an elastic substance, together with such additives as carbon-black, anti-aging agent and ozone-crack inhibitor, and then the mixture can be vulcanized and molded.

The elastic substances which may be used in carrying out this invention include natural rubber, and synthetic rubbers, such as polybutadiene, copolymers of styrene and butadiene, and other known rubbery polymers.

The material to be added for the improvement of wiper blades in this invention can be 1 to 100 parts as against 100 parts of the elastic substance; but usually 5 to 60 parts of it, or preferably 10 to 30 parts, will be used. If it is employed in less than one part, smooth surface movement of the blade will not be assured; if, however, it is more than 100 parts, the wiper blade will become softened or deformed.

Other additives include magnesium carbonate, calcium carbonate, carbon black, lead monoxide, clay and other common plasticizers; anti-aging agents; and ozone-crack inhibitors as well as sulphur for vulcanization. In this invention these substances will be added before forming, if need be.

Thus, this invention results in a wiper blade which is molded out of a blending of 100 parts of an elastic substance selected from among natural rubber and synthetic rubbers and 1 to 100 parts of said material of the Formula I, with other ingredients added as necessary.

Suitable materials to be blended with an elastic substance to form a wiper blade according to the present invention are represented in the following Formula I.

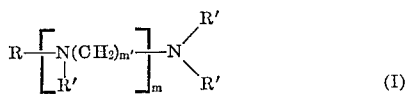  (I)

wherein

R is an aliphatic hydrocarbon having 8 to 24 carbon atoms and preferably alkyl and alkenyl;

R' is selected from the group consisting of a hydrogen, CHR"CHR"COOR''' and CHR"CHR"CN, at least one R' being CHR"CHR"COOR''' or CHR"CHR"CN, in which R" is selected from the group consisting of a hydrogen radical and an aliphatic hydrocarbon radical having 1 to 5 carbon atoms (preferably alkyl) and R''' is an aliphatic hydrocarbon radical (preferably alkyl and alkenyl) having 1 to 24 carbon atoms;

$m$ is an integer selected from 0, 1 and 2; and $m'$ is an integer selected from 2 and 3.

Illustrative examples of the compounds of Formula I are:

(1) $C_{12}H_{25}N-(CH_2)_3NH-CH_2CH_2COOCH_3$
$\phantom{C_{12}H_{25}N-(CH_2)_3N}|$
$\phantom{C_{12}H_{25}N-(CH_2)_3}CH_2CH_2COOCH_3$ (2) $C_{18}H_{33}N(CH_2)_3NHCH_2CH_2CN$
$\phantom{C_{18}H_{33}N(CH_2)_3}|$
$\phantom{C_{18}H_{33}N(CH_2)}CH_2CH_2CN$ (3) $C_{18}H_{35}N(CH_2)_3N(CH_2)_3NHCH_2CH_2CN$
$\phantom{C_{18}H_{35}N(CH_2)_3N(CH_2)}|$
$\phantom{C_{18}H_{35}N(CH_2)_3N(CH_2)}CH_2CH_2CN$
$\phantom{C_{18}H_{35}N(CH}|$
$\phantom{C_{18}H_{35}N(CH}CH_2CH_2CN$ (4) $C_{18}H_{37}NHCH_2CH_2NHCH_2CH_2CN$ (5) $C_{18}H_{35}N(CH_2)_3N(CH_2)_3NHCH_2CH_2COOC_2H_5$
$\phantom{C_{18}H_{35}N(CH_2)_3N(CH_2)}|$
$\phantom{C_{18}H_{35}N(CH_2)_3N(CH_2)}CH_2CH_2COOC_2H_5$
$\phantom{C_{18}H}|$
$\phantom{C_{18}H}CH_2CH_2COOC_2H_5$ (6) $C_{18}H_{31}NH(CH_2)_2NH(CH_2)_2NHCH_2CH_2COOCH_3$ (7) $C_{18}H_{37}NHCH_2CH_2CN$ (8) $C_{12}H_{25}N(-CH_2)_3NHCH_2CH_2CN$
$\phantom{C_{12}H_{25}N(-CH_2)_3}|$
$\phantom{C_{12}H_{25}N(-CH_2)}CH_2CH_2CN$ (9) $C_{12}H_{25}NHCH_2CH_2COOCH_3$

(10) $C_{18}H_{37}N(CH_2)_3NHCH_2CH_2COOCH_3$
$\phantom{C_{18}H_{37}N(CH_2)_3}|$
$\phantom{C_{18}H_{37}N(CH_2)}CH_2CH_2COOCH_3$

(11) $C_{18}H_{35}NH(CH_2)_2NH(CH_2)_2NHCH_2CH_2CN$

(12) $C_{12}H_{25}NH(CH_2)_2NHCH_2CH_2COOCH_3$

(13) $C_{12}H_{25}N(CH_2)_2NCH_2CH_2COOCH_3$
$\phantom{C_{12}H_{25}N(CH_2)_2N}|$
$\phantom{C_{12}H_{25}N(CH_2)}CH_2CHCOOCH_3$
$\phantom{C_{12}H_{25}N(CH_2)_2NCH_2C}|$
$\phantom{C_{12}H_{25}N(CH_2)_2NCH_2C}CH_3$

(14) $C_{12}H_{25}NH(CH_2)_2NHCH_2CHCOOCH_3$
$\phantom{C_{12}H_{25}NH(CH_2)_2NHCH_2C}|$
$\phantom{C_{12}H_{25}NH(CH_2)_2NHCH_2C}C_2H_5$

(15) $C_{12}H_{25}NH(CH_2)_2NHCH_2CH_2COOC_{18}H_{35}$

(16) $C_{12}H_{25}NH(CH_2)_2NHCH_2CHCOOCH_3$
$\phantom{C_{12}H_{25}NH(CH_2)_2NHCH_2C}|$
$\phantom{C_{12}H_{25}NH(CH_2)_2NHCH_2C}C_4H_9$ The wiper blade according to this invention is free from electrification; moves very smoothly with the surface tension drastically reduced; and is resistant to aging for a long period of time.

Actual examples of embodiments of this invention will now be given in comparison with conventionally treated wiper blades. It should not be considered, however, that these examples exhaust all the possible embodiments of this invention.

EXAMPLE 1

One hundred parts (by weight) of a plasticized chloroprene synthetic rubber (Neoprene WRT), was blended with four parts of magnesium oxide, five parts of zinc white, 0.5 part of stearic acid, 70 parts of carbon black, two parts of anti-aging agent, two parts of ozone-crack inhibitor, 0.7 part of 2-mercapto imidazoline, and five parts of processed oil.

Wiper blade (1) was obtained by vulcanizing and forming this mixture.

Wiper blade (2) was obtained by compounding the same mixture with 20 parts of the formula:

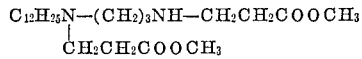

vulcanizing and forming it.

Wiper blade (3) was obtained by compounding the same mixture with 20 parts of the formula:

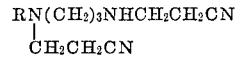

wherein R is a hydrocarbon radical derived from an aliphatic acid of rape seed oil, kneading, vulcanizing and forming it.

Wiper blade (4) was obtained by compounding the same mixture with 20 parts of the formula:

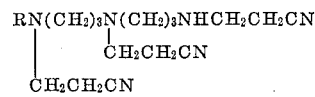

wherein R is a hydrocarbon radical derived from an aliphatic acid of beef tallow, kneading, vulcanizing and forming it.

Wiper blade (5) was obtained by compounding the same mixture with 20 parts of the formula:

$$C_{18}H_{37}NHCH_2CH_2NHCH_2CH_2CN$$

kneading, vulcanizing and forming it.

Wiper blade (6) was obtained by compounding the same mixture with 20 parts of the formula:

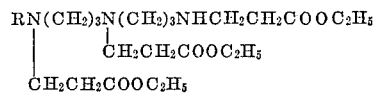

wherein R is a hydrocarbon radical derived from an aliphatic acid of beef tallow, kneading, vulcanizing and forming it.

Wiper blade (7) was obtained by compounding the same mixture with 20 parts of the formula:

$$RNH(CH_2)_2NH(CH_2)_2NHCH_2CH_2COOCH_3$$

wherein R is a hydrocarbon radical derived from an aliphatic acid of coconut oil, kneading, vulcanizing and forming it.

Wiper blade (8) was obtained by immersing the wiper blade (1) in a solution containing 1.5 parts by weight of sodium hypochlorite and 6.0 parts by weight of 35% hydrochloric acid in 1000 parts of water for 3 minutes and then surface-treating it.

Wiper blade (9) was obtained by blending 100 parts of smoked sheet rubber with 35 parts of zinc white, 3 parts of sulphur, 3 parts of stearic acid, 3 parts of accelerator and 7 parts of dioctyl sodium sulfosuccinate, vulcanizing and forming it. This composition is similar to the compositions disclosed in U.S. Pat. 2,392,982.

With these wiper blades (1) to (9), the front windshield of an automobile which had a flowing water film formed thereon was wiped and the load on the wiper motor was measured. The results were as follows:

| | Types of wiper blades | | | | | | | | |
|---|---|---|---|---|---|---|---|---|---|
| | 1 | 2 | 3 | 4 | 5 | 6 | 7 | 8 | 9 |
| Wiper motor load (amperes) | 4.2 | 3.1 | 3.1 | 3.1 | 3.1 | 3.0 | 3.3 | 3.2 | 3.2 |
| Cleaning effect | (¹) | (²) | (²) | (²) | (²) | (²) | (²) | (²) | (²) |

¹ Violent vibration, poor.
² Good.

In the case of wiper blade (1), a large load was imposed on the wiper motor, and accordingly a violent vibration was caused on the glass surface with a very poor cleaning effect. With wiper blades (2) to (7) which were obtained by adding said material of the Formula I, the cleaning effect was very good. Meanwhile, in the case of wiper blades (8) and (9), the load on the wiper motor was nearly the same and the cleaning effect was equally good.

Next, the front windshield of an automobile onto which small water drops were attached was wiped and the load imposed on the wiper motor was measured. The results were as follows:

|  | Types of wiper blades | | | | | | | | |
|---|---|---|---|---|---|---|---|---|---|
|  | 1 | 2 | 3 | 4 | 5 | 6 | 7 | 8 | 9 |
| Wiper motor load (amperes) | 4.0 | 3.9 | 4.0 | 4.0 | 4.1 | 4.1 | 4.1 | 5.4 | 5.3 |
| Cleaning effect | (¹) | (¹) | (¹) | (¹) | (¹) | (¹) | (¹) | (²) | (²) |

¹ Good.
² Slight vibration, poor.

In the case of wiper blades (2) to (7), the cleaning effect was substantially good, though the load on the wiper motor increased more or less. In the case of wiper blades (8) and (9), the load on the wiper motor was large and the cleaning effect was poor.

EXAMPLE 2

Wiper blades (1), (2) and (8) in Example 1 were submitted to 100° C., to a 70 hours aging test for investigation of tensile strength, elongation and hardness, the results being listed below.

Surface-treated wiper blade (8) was found very liable to changes and aging, while all the others were less liable to changes and aging.

| Changes due to aging | Types of wiper blades | | |
|---|---|---|---|
|  | 1 | 2 | 8 |
| Tensile strength, percent | −5.0 | −6.0 | −49 |
| Elongation, percent | −9.6 | +1.4 | +68 |
| Hardness,° ¹ | +5 | +6 | +13 |

¹ Hardness was measured according to the rules of Japan Industrial Standard (JIS).

EXAMPLE 3

Wiper blades (1), (2) and (8) in Example 1 were exposed to the atmosphere in the state of being elongated 10% for 6 months to investigate the growth of cracks. The results showed that numerous cracks occurred only in the case of (8).

EXAMPLE 4

One hundred parts of a plasticized natural rubber (FAQ No. 3) was blended with five parts of zinc white, 2 parts of sulphur, 1 part of stearic acid, 120 parts of carbon black, two parts of anti-aging agent, 0.7 part of an accelerator and two parts of paraffin, 40 parts of hard clay.

Wiper blade (10) was obtained by kneading, vulcanizing and forming this mixture.

Wiper blade (11) was obtained by compounding the same mixture with 20 parts of $$C_{18}H_{37}NHCH_2CH_2CN$$

kneading, vulcanizing and forming it.

Wiper blade (12) was obtained by compounding the same mixture with 20 parts of

vulcanizing and forming it.

Wiper blade (13) was obtained by compounding the same mixture with 20 parts of $$C_{12}H_{25}NHCH_2CH_2COOCH_3$$

kneading, vulcanizing and forming it.

Wiper blade (14) was obtained by compounding the same mixture with 20 parts of

vulcanizing and forming it.

Wiper blade (15) was obtained by compounding the same mixture with 20 parts of $$RNH(CH_2)_2NH(CH_2)_2NHCH_2CH_2CN$$

wherein R is a hydrocarbon radical derived from an aliphatic acid of coconut oil, kneading, vulcanizing and forming it.

Wiper blade (16) was obtained by compounding the same mixture with 20 parts of $$C_{12}H_{25}NH(CH_2)_2NHCH_2CH_2COOCH_3$$

kneading, vulcanizing and forming it.

Wiper blade (17) was obtained by imersing said wiper blade (10) in a solution containing 1.5 parts by weight of sodium hypochlorite and 6.0 parts by weight of 35% hydrochloric acid in 1000 parts of water for 3 minutes for the purpose of surface treatment.

Wiper blade (18) was obtained by blending 100 parts of smoked sheet rubber with 35 parts of zinc white, 3 parts of sulphur, 3 parts of stearic acid, 3 parts of accelerator and 7 parts of dioctyl sodium sulfosuccinate, vulcanizing, and forming it.

All these wiper blades were submitted to wiping tests on the front windshield of an automobile which had a flowing water film formed thereon, for investigation of the load on the wiper motor. The results were as complied in the following table:

|  | Types of wiper blades | | | | | | | | |
|---|---|---|---|---|---|---|---|---|---|
|  | 10 | 11 | 12 | 13 | 14 | 15 | 16 | 17 | 18 |
| Wiper motor load (amperes) | 4.2 | 3.2 | 3.1 | 3.0 | 3.0 | 3.2 | 3.1 | 3.2 | 3.2 |
| Cleaning effect | (¹) | (²) | (²) | (²) | (²) | (²) | (²) | (²) | (²) |

¹ Violent vibration, poor.
² Good.

In the case of wiper blade (10), the load on the wiper motor was so large that the blade vibrated heavily on the glass surface with a very poor wiping effect. Meanwhile the blades (11), (12), (13), (14), (15), and (16), containing the compounds according to the present invention respectively, and the blade (17) and the blade (18) containing a surface active agent known per se caused nearly the same load on the wiper motor with no vibration and accordingly a good wiping effect was exhibited.

Next, the automobile front windshield onto which small water drops were attached was wiped and the load imposed on the wiper motor was measured. The results were shown in the following table:

|  | Types of wiper blades | | | | | | | |
|---|---|---|---|---|---|---|---|---|
|  | 11 | 12 | 13 | 14 | 15 | 16 | 17 | 18 |
| Wiper motor load (amperes) | 4.4 | 3.9 | 4.3 | 4.1 | 4.0 | 4.2 | 5.4 | 5.3 |
| Cleaning effect | (¹) | (¹) | (¹) | (¹) | (¹) | (¹) | (²) | (²) |

¹ Good.
² Slight vibration, poor.

In the case of wiper blades (11) to (16), the cleaning effect was good, though the load on the wiper motor increased more or less. In the case of wiper blades (17) and (18), the load on the motor was large and the cleaning effect was poor.

EXAMPLE 5

Wiper blades (10) to (14) and (17) obtained in Example 4 were placed in an aging test machine for 70 hours at 100° C., and thereafter they were measured for tensile strength, elongation and hardness with the following results:

| Changes due to aging | Types of wiper blades | | | | | |
|---|---|---|---|---|---|---|
| | 10 | 11 | 12 | 13 | 14 | 17 |
| Tensile strength, percent | −5.0 | −5.5 | −5.3 | −5.0 | −5.1 | −49.0 |
| Elongation, percent | −9.6 | +1.3 | +1.2 | +1.0 | +1.1 | −68.0 |
| Hardness, ° | +5 | +6 | +4 | +5 | +4 | +13 |

As seen from the above table wiper blade (17) surface-treated exhibited serious changes on aging, but all the others were found less subject to such changes.

EXAMPLE 6

Wiper blades (10) to (14) and (17) obtained in Example 4 were exposed to the atmosphere for 6 months in the state of being elongated 10% for investigation of crack growth. The results showed that the blade (17) which had been surface-treated developed numerous cracks, but the others did not.

What is claimed is:
1. A flexible rubber wiper blade having a reduced frictional co-efficient made from a rubber composition consisting essentially of 100 parts by weight of an elastic material selected from among natural rubber and synthetic rubbers and friction reducing amounts of a compound selected from the compounds having the following formula:

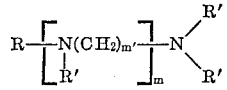

wherein
R is an aliphatic hydrocarbon radical having 8 to 24 carbon atoms;
R' is selected from the group consisting of hydrogen, CHR"CHR"COOR''' and CHR"CHR"CN, at least one R' being CHR"CHR"COOR''' or CHR"CHR"CN, in which R" is selected from the group consisting of hydrogen and an aliphatic hydrocarbon radical having 1 to 5 carbon atoms, and R''' is an aliphatic hydrocarbon radical having 1 to 24 carbon atoms;
$m$ is an integer selected from 0, 1 and 2; and
$m'$ is an integer selected from 2 and 3.

2. A wiper blade as claimed in claim 1, wherein at least one of R' is CHR"CHR"COOR'''.
3. A wiper blade as claimed in claim 2, wherein $m$ is 0.
4. A wiper blade as claimed in claim 2, wherein $m$ is 1.
5. A wiper blade as claimed in claim 2, wherein $m$ is 2.
6. A wiper blade as claimed in claim 1, wherein at least one of R' is CHR"CHR"CN.
7. A wiper blade as claimed in claim 6, wherein $m$ is 0.
8. A wiper blade as claimed in claim 6, wherein $m$ is 1.
9. A wiper blade as claimed in claim 6, wherein $m$ is 2.

10. The wiper blade of claim 1, in which said elastic material is selected from the group consisting of polybutadiene, copolymer of styrene and butadiene and chloroprene.
11. The wiper blade of claim 1, containing 10–30 parts by weight of said friction reducing compound.
12. The wiper blade of claim 1, containing 1 to 100 parts by weight of said friction reducing compound.
13. The wiper blade of claim 1, containing 5–60 parts of said friction reducing compound.
14. The wiper blade of claim 1, containing 10–30 parts of said friction reducing compound.
15. The wiper blade of claim 1, in which said friction reducing compound is selected from the group consisting of:

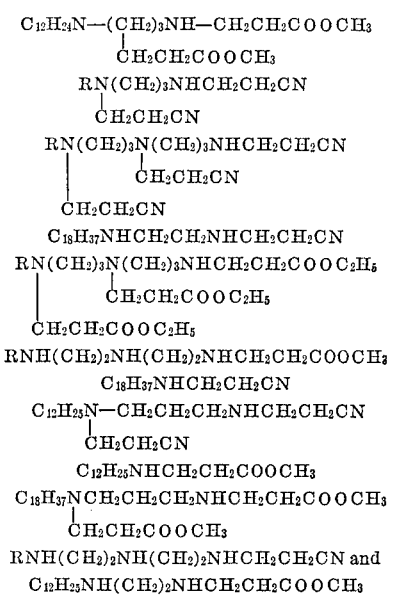

References Cited

UNITED STATES PATENTS

| 2,267,205 | 12/1941 | Kyrides | 252—357 |
| 2,392,982 | 1/1946 | Flaxman | 15—250.36 |
| 2,468,012 | 4/1949 | Isbell | 260—482 |
| 2,520,735 | 8/1950 | Ralston et al. | 260—761 |
| 2,787,633 | 4/1957 | Harrison et al. | 260—465.5 |

FOREIGN PATENTS 636,231  4/1950  Great Britain.

MORRIS LIEBMAN, Primary Examiner

H. H. FLETCHER, Assistant Examiner

U.S. Cl. X.R.

252—356, 357; 260—31.2, 31.8, 32.6, 465.5, 482, 761